Dec. 16, 1930.    C. J. REICHLE    1,784,848
BEARING FOR CONVEYER ROLLERS
Filed Nov. 9, 1927
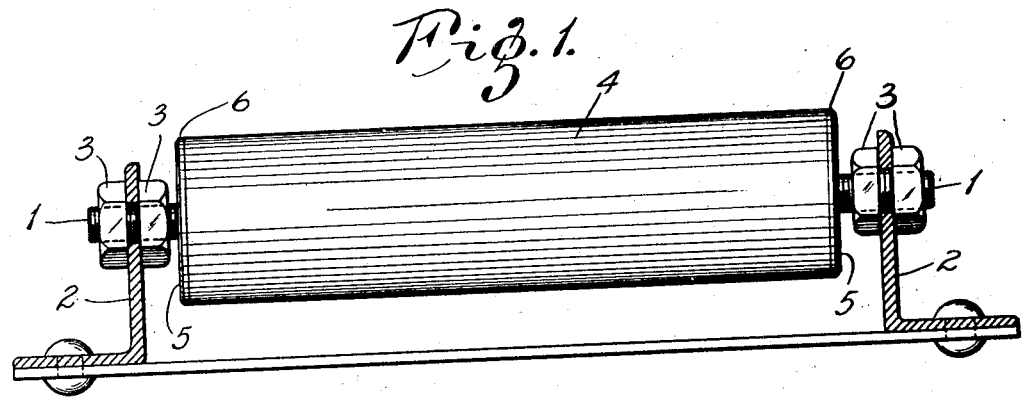
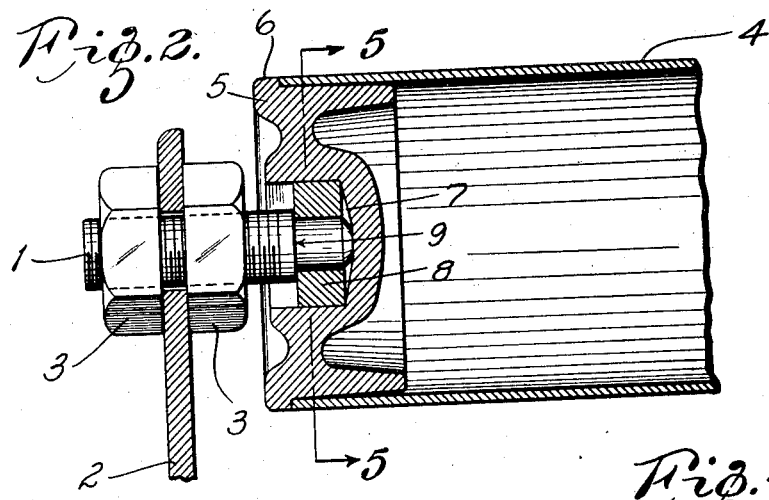
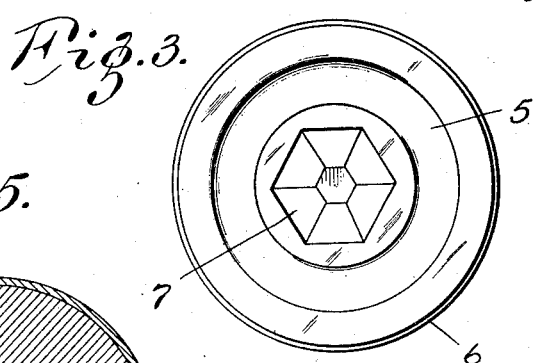
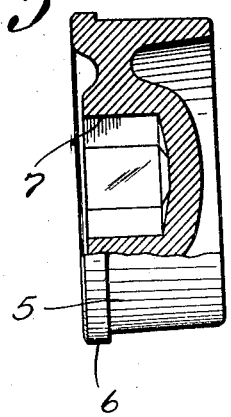
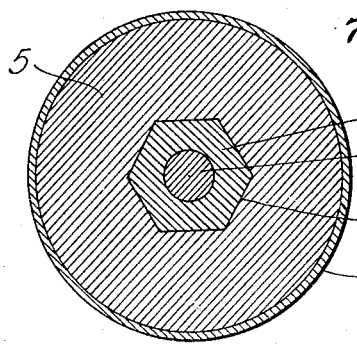
INVENTOR:
Carl J. Reichle
HIS ATTORNEYS.

Patented Dec. 16, 1930

1,784,848

UNITED STATES PATENT OFFICE

CARL J. REICHLE, OF DETROIT, MICHIGAN, ASSIGNOR TO ALVEY MANUFACTURING COMPANY, OF ST. LOUIS, MISSOURI, A CORPORATION OF MISSOURI

BEARING FOR CONVEYER ROLLERS

Application filed November 9, 1927. Serial No. 232,019.

My invention relates to conveyer rollers of the type used in connection with gravity conveyers, and has for its principal object to provide for the cheap and simple manufacture, mounting and replacement of the rollers. It consists principally in providing the end plugs of the rollers with non-circular recesses to receive non-circular bushings for the supporting spindles whose ends bear against the bottoms of said recesses.

In the accompanying drawings wherein like reference numerals refer to like parts wherever they occur, Fig. 1 is an end elevation of a gravity conveyer embodying my invention;

Fig. 2 is a vertical cross-section of part of the conveyer showing a conveyer roller in longitudinal section;

Fig. 3 is an end view and Fig. 4 is a fragmental sectional view of a roller with the bushing removed therefrom; and Fig. 5 is a cross-sectional view of a roller on the line 5—5 of Fig. 2.

In the construction illustrated, the conveyer roller has its ends mounted on spindles 1 that are spaced apart and adjustably mounted in the spaced side rails 2 of the conveyer frame, such spindles being locked in adjusted position by nuts 3 that are screwthreaded thereon on opposite sides of the side rail.

The roller illustrated comprises a tubular body 4 having its ends closed by circular plugs 5 that fit in the ends thereof. Each plug has a circumferential flange 6 that overlaps and bears against the end of the tubular body. The outer face of each end plug has a recess 7 into which the spindle enters and against the bottom of which the end of the spindle bears. This recess is of hexagonal or other polygonal or non-circular section and has fitted therein a bushing 8 of similar sectional outline, whereby the bushing is locked against rotation relative to the end plug but may be moved axially thereof. The bushing is provided with a central bore of proper size to fit the inner portion of the spindle and serve as a bearing therefor. The inner end of the spindle is rounded or coned to a thrust bearing surface of small area that cooperates with the center portion of the recess in the end cap; and at the side of the circumferential bearing surface, the diameter of the spindle is increased thereby forming a shoulder 9 which serves to lock the bushing against axial movement.

It is noted that by reason of their non-circular shape, the bushing is positively interlocked with the end plug and the annoyance due to the failure of a frictional contact between them is avoided, and it is easier and cheaper to adequately fit these parts together than would be necessary if the recess and the bushing were of circular outline. As the bushing is thus compelled to revolve with the roller, the wear on all sides of the bore of the bushing is equal and the roller is thus kept concentric with the axis of the spindles. It is also noted that the bushing is easily accessible and removable and interchangeable; and it may be made of bronze or other rust-proof material or of bearing metals suited to the conditions of actual service. Another advantage is that the space in the end plug back of the bushing is available as a chamber for lubricating grease. It is also noted that the plug completely closes the end of the roller and thereby prevents liquids from getting into the interior of the roller and causing corrosion thereof or souring or decaying and rendering the device unsanitary or causing offensive odor.

What I claim is:

1. A conveyer roller comprising a tubular body, end plugs therefor having non-circular recesses in their outer faces with the axial bottom portions of said plugs adapted to constitute thrust bearings and bearing bushings fitting in said recesses.

2. A conveyer roller comprising a tubular body, end plugs therefor having non-circular recesses in their outer faces with the axial bottom portions of said plugs adapted to constitute thrust bearings and bearing bushings with peripheries fitting in said recesses and with spaces between such bushings and the bottoms of said recesses.

3. A roller conveyer comprising spaced supporting rails, oppositely disposed spaced bearing spindles mounted on said rails, and conveyer rollers rotatably mounted on said spindles, said rollers comprising a tubular body having end plugs with non-circular recesses in their outer faces against the bottoms of which the ends of said spindles bear, and non-circular bushings fitting in said recesses and constituting bearings for said spindles.

4. A roller conveyer comprising spaced supporting rails, oppositely disposed spaced bearing spindles adjustably mounted on said rails, and conveyer rollers rotatably mounted on said spindles, said rollers comprising a tubular body having end plugs with non-circular recesses in their outer faces against the bottoms of which the ends of said spindles bear, and non-circular bushings fitting in said recesses and constituting bearings for said spindles.

Signed at Detroit, Michigan, this 2d day of November, 1927.

CARL J. REICHLE.